No. 668,875.  
C. J. HEDEMANN.  
LIQUID WEIGHING MACHINE.  
(Application filed Sept. 7, 1900.)  
Patented Feb. 26, 1901.
(No Model.)
2 Sheets—Sheet 1.
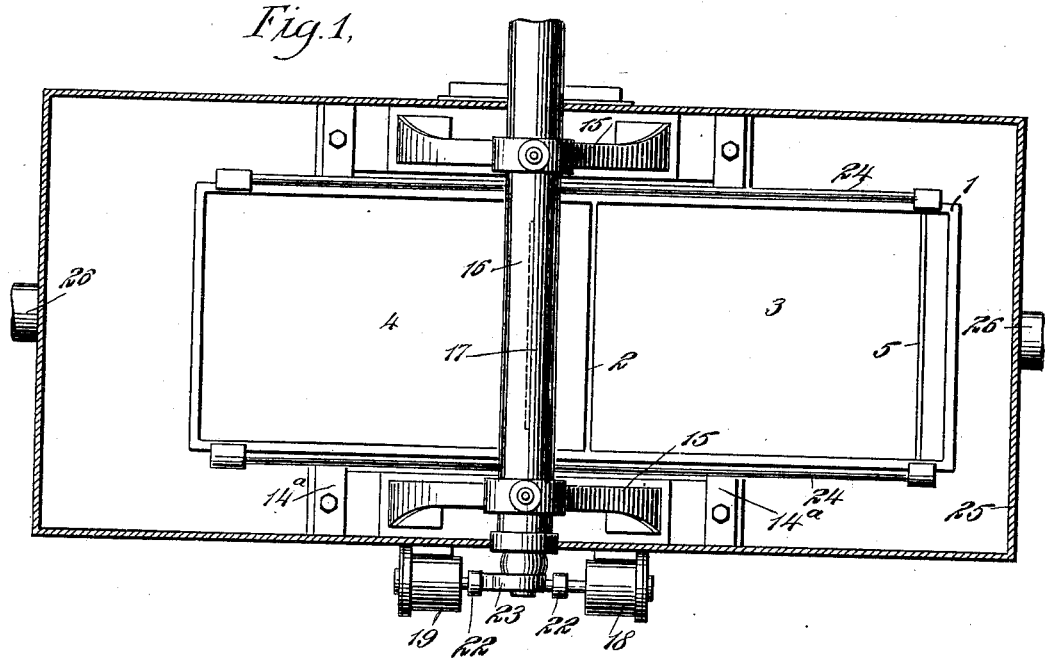
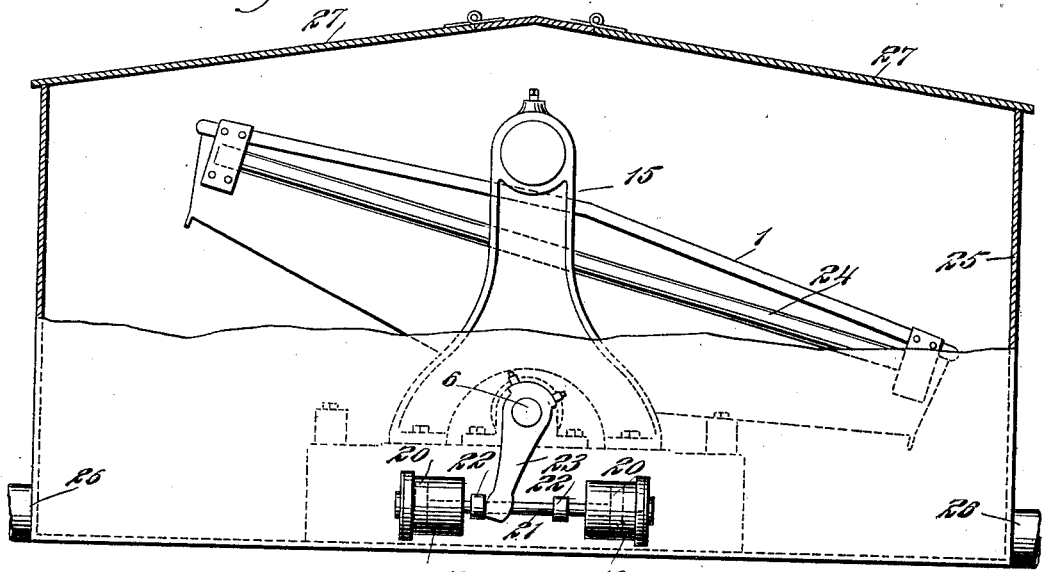
WITNESSES:
Edward Thorpe
C. R. Ferguson
INVENTOR
Christian J. Hedemann,
BY
ATTORNEYS No. 668,875. Patented Feb. 26, 1901.
C. J. HEDEMANN.
LIQUID WEIGHING MACHINE.
(Application filed Sept. 7, 1900.)
(No Model.) 2 Sheets—Sheet 2.
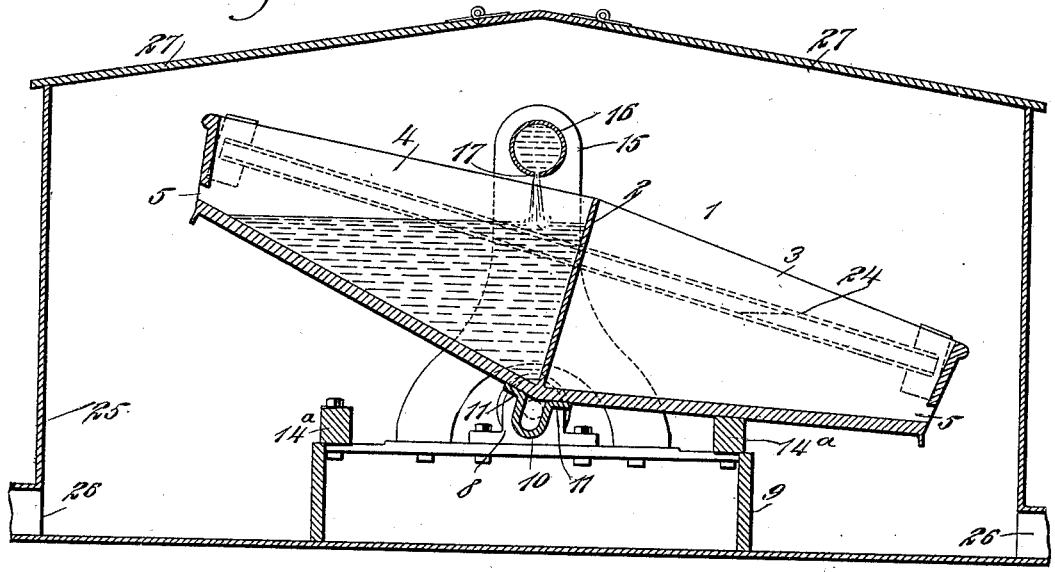
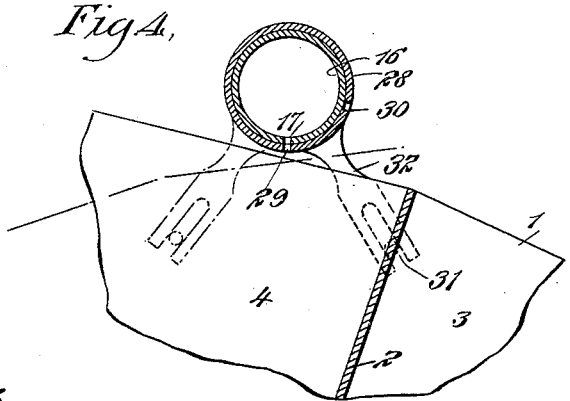
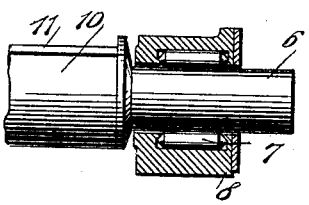
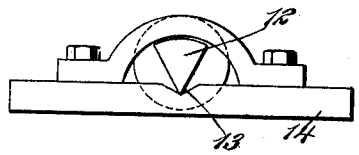
WITNESSES:
Edward Thorpe
C. R. Ferguson
INVENTOR
Christian J. Hedemann.
BY 
ATTORNEYS
THE NORRIS PETERS CO., PHOTO-LITHO., WASHINGTON, D. C.

UNITED STATES PATENT OFFICE.

CHRISTIAN J. HEDEMANN, OF HONOLULU, HAWAII.

LIQUID-WEIGHING MACHINE.

SPECIFICATION forming part of Letters Patent No. 668,875, dated February 26, 1901.

Application filed September 7, 1900. Serial No. 29,308. (No model.)

*To all whom it may concern:*

Be it known that I, CHRISTIAN J. HEDEMANN, a subject of the King of Denmark, and a resident of Honolulu, Oahu, Hawaii, have invented a new and Improved Liquid-Weighing Machine, of which the following is a full, clear, and exact description.

This invention relates to improvements in machines for weighing liquids, such as cane-juice or other material capable of running or discharging from a supply-pipe; and the object is to provide a machine of this character that shall be very sensitive and quick in its operation, thus insuring a correct weighing.

I will describe a liquid-weighing machine embodying my invention, and then point out the novel features in the appended claims.

Reference is to be had to the accompanying drawings, forming a part of this specification, in which similar characters of reference indicate corresponding parts in all the figures.

Figure 1 is a plan view of a weighing-machine embodying my invention, with the outer casing in horizontal section. Fig. 2 is a side elevation thereof, the outer casing being shown in vertical section. Fig. 3 is a vertical section of the machine. Fig. 4 is a sectional view of a modification, showing a feed-cut-off that may be employed. Fig. 5 is a side elevation, partly in section, showing one form of bearing for the tilting tray; and Fig. 6 is a side elevation of another form of bearing for the tray.

Referring to the drawings, 1 designates a tilting tray divided at its center by a partition 2, thus providing two receiving or weighing compartments 3 4. The bottom walls of these compartments are inclined from the center outward and upward, and at the upper end of each inclined bottom is an outlet 5 for the material. It is designed that this tray shall swing with as little friction as possible. I therefore provide it at its center and at the bottom or below its point of gravity with trunnions 6, which have bearings on antifriction-rollers 7, arranged in boxings 8, placed upon a pedestal 9. These trunnions 6 are connected to a casting 10, having at its upper portion outwardly-extended flanges 11, through which bolts pass to secure the same to the bottom of the tray. In Fig. 6, however, I have shown trunnions 12 as made in the form of knife-bearings and engaging with V-shaped notches 13 in a bearing-bar 14. The downward movement of the tray at each end is limited by a stop-bar 14ª, mounted on the pedestal 9.

Supported in standards 15, mounted on the pedestal 9, is a supply-pipe 16, leading from any suitable source of supply and having an outlet in the form of a slot 17 at its lower side for discharging liquid or other material into the tray.

In order to prevent a heavy shock to the tray when the filled compartment comes to rest, a retarding device is employed. This retarding device as here shown consists of air-cylinders 18 and 19, each having a small outlet at its end, and operating in each is a piston 20, the two pistons being connected by a stem 21, and on this stem 21 are collars 22, between which is movable and which are adapted to be engaged by an arm 23, mounted on one of the trunnions 6. This arm 23 has a bifurcated end engaging over the stem 21.

Arranged upon each side of the tray and extending nearly the entire length thereof is a tube 24 for containing a shifting weight—such, for instance, as a small amount of mercury.

The whole device as above described is inclosed within a casing 25, having an outlet 26 at its opposite ends, leading to a suitable receiving-tank, and the top of this casing consists of swinging covers 27, so that upon opening the same the tray may be easily reached for cleaning or other purpose.

It is to be understood that the weight of the two portions or compartments shall be evenly balanced and the amount of mercury or other shifting weight in the tubes 24 shall be substantially equal to the weight of material to be deposited in each compartment. This weight of mercury, however, should not quite equal the weight of the material to be weighed, because it is designed that as a compartment fills nearly to its discharging-point one end of the mercury shall extend slightly beyond the side of the partition 2 in which the liquid is discharged. When the mercury reaches this point, the liquid-containing side will completely overbalance the opposite side, so as to move rapidly to its discharging position.

In the operation the liquid runs into one compartment, while the other compartment rests on the cross-bar or stop 14ª. As the liquid fills the compartment of the weighing-tray, the center of gravity, due to the weight of the liquid being filled in, gradually shifts until the weight of the opposite compartment and mercury on the other side is balanced. At this point of balancing the machine being so sensitive the smallest addition in the compartment moves the latter from the position of rest with increasing rapidity to the position where the shifting outward of the center of gravity in the filled compartment takes place and the center partition rapidly passes the stream of liquid, which then commences to fill the other compartment, while the compartment just filled discharges its contents.

As before described, the air-cushions in the cylinders 18 and 19 will prevent a heavy shock to the tray in coming to rest. These air-cushions are so arranged, however, as not to commence action until the center partition has passed the stream of liquid, when the tilting takes place. Thus an error due to friction, owing to pressure in the air-cushions, is prevented. The action of the air-cushions is adjusted by means of suitably-sized air-discharging holes in the heads of the cylinders.

The machine may be made more exact possibly—that is, by overcoming the slight friction—by providing the pipe 16 with an automatically-actuated cut-off. This cut-off, as shown in Fig. 4, consists in a valve-pipe 28, having slots 29 and 30, designed to register with the slot 17 alternately, so as to discharge into opposite compartments, this discharging, however, being cut-off by the said valve, while the portion between the slots 29 and 30 is moving over the slot 17. This movement of the pipe 28 is caused by the rocking movement of the weighing-tray by means of pins 31, arranged on the outer sides of the tray and passing into slots formed in arms 32, connected to said pipe 28.

Having thus described my invention, I claim as new and desire to secure by Letters Patent—

1. A weighing-machine, comprising a tilting tray divided into two compartments, means for discharging material into the tray, two air-cylinders located respectively at opposite sides of the fulcrum of the tray, pistons in said cylinders, a stem connecting the two pistons and having collars or stops thereon, and an arm attached to one of the tray-trunnions for engaging the stops or collars alternately, substantially as specified.

2. A weighing-machine, comprising a tilting or rocking tray, divided into two equal compartments having outlets at the outer ends, mercury-containing tubes attached to opposite sides of said tray, a feed-pipe over the tray and having an outlet, and a valve actuated by movements of the tray for controlling said outlet, substantially as specified.

In testimony whereof I have signed my name to this specification in the presence of two subscribing witnesses.

CHRISTIAN J. HEDEMANN.

Witnesses:
JNO. M. RITTER,
C. R. FERGUSON.